W. D. St. Clair,
Threshold.

No. 100,461.   Patented Mar. 1, 1870.

INVENTOR.

William D. St Clair

WITNESSES.

F. A. Lehmann

Chas. B. Parkhurst

United States Patent Office.

WILLIAM D. ST. CLAIR, OF CHICAGO, ILLINOIS.

Letters Patent No. 100,461, dated March 1, 1870.

IMPROVEMENT IN THRESHOLDS.

The Schedule referred to in these Letters Patent and making part of the same.

I, WILLIAM D. ST. CLAIR, of Chicago, in the county of Cook, and State of Illinois, have invented a certain Improvement in the Threshold described in patent granted Joseph Johnston April 6, 1869, No. 88,572, and consists in forming the two strips of the threshold with dovetail grooves, and making the rubber strip of corresponding form, the parts being so constructed that the rubber may be drawn into the grooves and held without tacking.

In the drawings which are hereto attached and made part of this specification—

Figure 1:
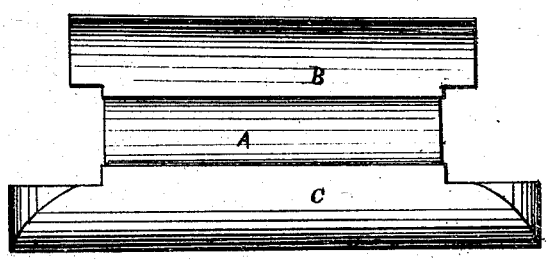
Figure 1 represents a door-sill or threshold to which my invention is applied.
Figure 2:
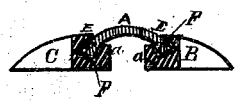
Figure 2 is an end view of the same.

A is the strip of rubber or other flexible material, provided for in the patent above referred to, connecting the wooden pieces B and C, and constituting in combination with them a door-sill. The way in which these parts have been heretofore attached, is by means of screws, tacks, or brads driven through the lip $a$ and the edge of the rubber strip A, and passing into the main part of the wooden piece B or C. This method gives rise to some objections. Thus the lip $a$ is liable to split, and the splinters soon wear out the rubber. And there is no hold upon the edge of the rubber between the tacks or screws, and the rubber is liable to work loose. And again there is a considerable expense of labor and material caused by this former method. By my invention these difficulties and objections are obviated.

In carrying out my invention, I make the groove E, which is cut in the edge of the strips B and C, for the purpose of receiving the edge of the rubber A, of a dovetailed or other form, so that it has a wider area within than at its opening at the surface of the wooden strip. The rubber strip is formed with a corresponding increase of thickness at its edge, so that it cannot be inserted nor withdrawn through the narrow opening of the groove, but may be slipped lengthwise in the groove. Thus the parts may be expeditiously put together, and are securely held at all points without breakage or damage.

I do not claim attaching rubber to wood by means of a dovetail groove, but

What I do claim, as an improvement upon the threshold described in the Letters Patent referred to, is—

The described threshold, when the parts B C are formed with the dovetail grooves and the strip A with corresponding edges, the parts being so adapted to each other that the rubber may slide into the wood and be held without tacking, all as set forth.

WILLIAM D. ST. CLAIR.

Witnesses:
T. C. CONNOLLY,
I. W. ANGUS.